(12) United States Patent
Young et al.

(10) Patent No.: US 10,000,723 B2
(45) Date of Patent: Jun. 19, 2018

(54) DISTILLATION SYSTEM

(71) Applicant: Young Living Essential Oils, LC, Lehi, UT (US)

(72) Inventors: D. Gary Young, Alpine, UT (US); Aaron S. Raymond, American Fork, UT (US); Chet L. Bartlett, Nephi, UT (US); John R. Connolly, West Haven, UT (US)

(73) Assignee: YOUNG LIVING ESSENTIAL OILS, LC, Lehi, UT (US)

( * ) Notice: Subject to any disclaimer, the term of this patent is extended or adjusted under 35 U.S.C. 154(b) by 615 days.

(21) Appl. No.: 14/608,100

(22) Filed: Jan. 28, 2015

(65) Prior Publication Data

US 2015/0209688 A1 Jul. 30, 2015

Related U.S. Application Data

(60) Provisional application No. 61/932,245, filed on Jan. 28, 2014.

(51) Int. Cl.
*C11B 9/02* (2006.01)
*B01D 11/02* (2006.01)

(52) U.S. Cl.
CPC .......... *C11B 9/027* (2013.01); *B01D 11/0207* (2013.01); *B01D 11/0219* (2013.01); *B01D 11/0296* (2013.01)

(58) Field of Classification Search
CPC .................... C11B 9/027; B01D 11/0207
See application file for complete search history.

(56) References Cited

U.S. PATENT DOCUMENTS

| | | | | |
|---|---|---|---|---|
| 4,230,535 | A * | 10/1980 | Howard | B01D 1/2856 202/185.2 |
| 4,685,938 | A * | 8/1987 | Oliker | B01D 53/0454 95/148 |
| 5,518,606 | A * | 5/1996 | Mohle | C10C 3/08 134/20 |
| 5,976,323 | A * | 11/1999 | Milde | B01D 3/42 203/2 |
| 2005/0082157 | A1* | 4/2005 | Kiran Babu | B01D 3/10 202/83 |
| 2009/0071813 | A1* | 3/2009 | Beste | B01D 3/36 203/32 |

OTHER PUBLICATIONS http://www.experience-essential-oils.com/distilling-essential-oils.html, obtained from Wayback Machine from Oct. 6, 2011.*

* cited by examiner

*Primary Examiner* — Sean E Conley
*Assistant Examiner* — Matthew D Krcha
(74) *Attorney, Agent, or Firm* — Kunzler, PC (57) ABSTRACT

Apparatuses, systems, methods, and computer program products are disclosed for extracting essential oil from plant material. A distillation chamber is coupleable in fluid receiving communication with a steam source via a first valve and the distillation chamber has a first temperature sensor and a vapor outlet. Steam from a steam source and essential oil vapor operably exit a distillation chamber through a vapor outlet. A condenser is in fluid receiving communication with a vapor outlet of a distillation chamber and steam and essential oil vapor are condensed in the condenser to form liquid water and essential oil product, respectively, that operably exit through a liquid outlet. A controller is configured to control a first valve based on readings from a first temperature sensor.

20 Claims, 5 Drawing Sheets

DISTILLATION SYSTEM

CROSS-REFERENCES TO RELATED APPLICATIONS

This application claims the benefit of U.S. Provisional Patent Application No. 61/932,245 entitled "STEAM DISTILLATION" and filed on Jan. 28, 2014 for D. Gary Young, which is incorporated herein by reference.

FIELD

This invention relates to distillation systems and more particularly relates to distillation systems for extracting essential oil from plant material.

BACKGROUND

Essential oils are natural aromatic liquids found in the roots, stem, bark, seeds, flowers, and other parts of plants. Technically, essential oils are fat soluble, non-water-based phytochemicals that include volatile organic compounds. The chemistry of any particular essential oil can be very complex and may consist of hundreds of different and unique chemical compounds. These oils give plants their distinctive smells, provide protection against disease, and assist in pollination. In their pure form, essential oils are translucent with colors ranging from clear to pink to blue. At different times throughout history, essential oils have also been used for medical purposes in which these oils have been inhaled, topically applied, or ingested.

The process of extracting essential oils from plant material often involves precise temperature and pressure control. In other words, extracting essential oil is a delicate procedure and the quality/extent of essential oil extraction from plant material is sensitive to and dependent on temperature and/or pressure parameters.

SUMMARY

From the foregoing discussion, it should be apparent that a need exists for a system that efficiently extracts essential oil from plant material. The subject matter of the present application has been developed in response to the present state of the art, and in particular, in response to the problems and needs in the art that have not yet been fully solved by currently available essential oil extraction systems. Accordingly, the present disclosure has been developed to provide a distillation system for extracting essential oil product from plant material that overcomes many or all of the above-discussed shortcomings in the art.

Systems are presented for distilling essential oils. A system, in one embodiment, includes a distillation chamber for extracting essential oil from plant material. A distillation chamber, in certain embodiments, is coupleable in fluid receiving communication with a steam source via a first valve and the distillation chamber has a first temperature sensor and a vapor outlet. Steam from a steam source and essential oil vapor, in one embodiment, operably exit a distillation chamber through a vapor outlet. A system, in a further embodiment, includes a condenser for condensing vapors. A condenser, in certain embodiments, is in fluid receiving communication with a vapor outlet of a distillation chamber and a steam and an essential oil vapor are condensed in the condenser to form liquid water and essential oil product, respectively, that operably exit through a liquid outlet. In a further embodiment, a system includes a controller comprising an extraction module that is configured to control a first valve based on readings from a first temperature sensor.

In one implementation, a coolant inlet includes a second valve, a liquid outlet includes a second temperature sensor, and a controller includes a condenser module. A condenser module, in certain embodiments, is configured to control a second valve based on readings from a second temperature sensor. In another embodiment, a first temperature sensor of a distillation chamber is a first temperature sensor array comprising a plurality of temperature sensors. A plurality of temperature sensors may be spaced apart vertically along a height of a distillation chamber and/or may be spaced apart circumferentially around the distillation chamber.

In a further embodiment, a distillation chamber includes a vent valve and an extraction module is further configured to control the vent valve to decrease pressure in the distillation chamber. In another embodiment, a distillation chamber has a plant material bed that supports a plant material in a desired position within the distillation chamber. In one embodiment, a plant material bed in a distillation chamber is moveable along a height of the distillation chamber. A first temperature sensor may include a sensing element that is disposed in a recess of an internal surface of a distillation chamber.

Another embodiment of a system is presented for distilling essential oils. A system, in one embodiment, includes a distillation chamber for extracting essential oil from plant material. A distillation chamber, in certain embodiments, is coupleable in fluid receiving communication with a steam source via a first valve and the distillation chamber has a first temperature sensor and a vapor outlet. Steam from a steam source and essential oil vapor, in one embodiment, operably exit a distillation chamber through a vapor outlet. A system, in a further embodiment, includes a condenser for condensing vapors. A condenser, in one embodiment, is in fluid receiving communication with a vapor outlet of a distillation chamber and the condenser has a coolant inlet, a coolant outlet, and a liquid outlet, with the coolant inlet having a second valve and the liquid outlet having a second temperature sensor. Steam and an essential oil vapor, in certain embodiments, are condensed in a condenser to form liquid water and an essential oil product, respectively, that operably exit through a liquid outlet. In one embodiment, a system includes a controller having an extraction module and a condenser module. An extraction module, in certain embodiments, is configured to control a first valve based on readings from a first temperature sensor and a condenser module is configured to control a second valve based on readings from a second temperature sensor.

In one embodiment, a first temperature sensor of a distillation chamber includes a plurality of temperature sensors. A plurality of temperature sensors, in certain embodiments, may be spaced apart vertically along a height of a distillation chamber and/or may be spaced apart circumferentially around a distillation chamber. In one embodiment, a distillation chamber includes a plant material bed that supports a plant material in a desired position within the distillation chamber, with a plurality of temperature sensors circumferentially spaced apart to monitor the temperature of the plant material bed.

In one embodiment, a distillation chamber includes a plant material bed that supports plant material in a desired position within the distillation chamber. A plant material bed in a distillation chamber, in certain embodiments, is moveable along a height of the distillation chamber and a first temperature sensor may include a sensing element that is disposed in a recess of an internal surface of the distillation chamber.

Apparatuses are presented for distilling essential oils. An apparatus, in one embodiment, includes an extraction module configured to control a steam valve upstream of a distillation chamber based on readings from a temperature sensor of the distillation chamber and based on one or more temperature set points corresponding to the distillation chamber. An apparatus, in a further embodiment, includes a condenser module configured to control a valve of a coolant inlet of a condenser based on readings from a temperature sensor of a liquid outlet of the condenser.

In certain embodiments, the extraction module is configured to access a plurality of data tables, with each data table corresponding to one or more types of plant material. Each data table of a plurality of data tables, in one embodiment, includes multiple stages, with each stage having a temperature set point and a corresponding time duration. An extraction module, in certain embodiments, controls a steam valve to sequentially step through each of a multiple stages by ramping a distillation chamber to each temperature set point for a corresponding time duration from one of a plurality of data tables. In one embodiment, multiple stages of each data table include sequentially increasing temperature set points and sequentially increasing time durations.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided. One skilled in the relevant art will recognize, however, that the disclosure may be practiced without one or more of the specific details, or with other methods, components, materials, and so forth. In other instances, well-known structures, materials, or operations are not shown or described in detail to avoid obscuring aspects of the disclosure.

Figure 1:
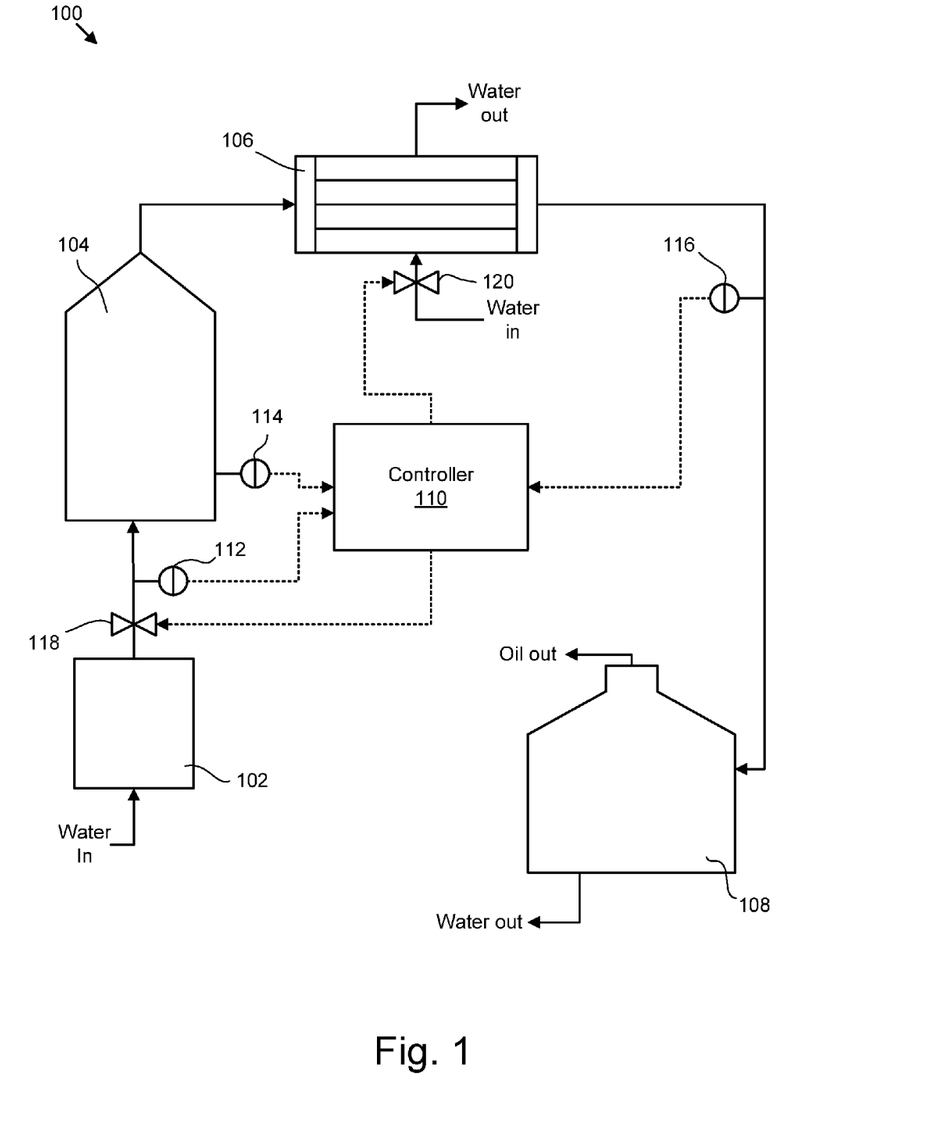
FIG. 1 is a schematic block diagram of a distillation system, according to one embodiment.

The present invention relates generally to steam distillation of essential oils. FIG. 1 depicts one embodiment of a system 100 for steam distillation. Steam distillation, in certain embodiments, is a separation process for materials that are temperature sensitive, such as essential oils. The system 100, in the depicted embodiment, includes a boiler 102, a distillation chamber 104, a condenser 106, a separator 108, a controller 110, a plurality of temperature sensors 112, 114, 116, and one or more valves 118, 120.

In one embodiment, materials such as essential oils may be produced using a simple distillation process. Plant material may be loaded into an extraction chamber filled with water, such as the distillation chamber 104, which may be heated to soften the plant fiber so that the oil molecules can be released. As steam begins to rise, the oil molecules may be released as vapors, which may be carried with the steam into the condenser 106. The cooling water in the condenser 106 may convert the steam to water and the vapors to oil. The oil and water mixture may continue to flow into a separator such as the separator 108 where the oil may rise to the top of the water so that it may be drained off into containers. Clove, nutmeg, or the like may be distilled in this manner.

In a further embodiment, materials such as essential oils may be produced using a hydro-distillation process. In this process, plant materials, such as the resin of the frankincense or myrrh trees may, be extracted through the method of hydro-distillation. The resin may be placed in the distillation chamber 104 that is filled with boiling water. The boiling water may be in constant motion while steam is injected into the distillation chamber 104. The resinous gas may be released into the steam, which may carry the gas to the condenser 106 where the steam and vapor may be gradually cooled to a liquefied form. In one embodiment, the essential oil product can flow to the top of the separator 108 and the liquid water can collect in the bottom of the separator 108 to be poured off into containers (potentially for reuse).

In another embodiment, materials such as essential oils may be produced using a traditional distillation process. Plant material may be loaded into the distillation chamber 104 and tightly compacted. As the boiler 102 heats the water, steam may be released into the bottom of the distillation chamber 104 and may start to travel upward, saturating the material. The steam may impregnate the plant fiber, causing it to release the oil molecule as a gas from the molecule pocket or channel. The steam may carry the gas from the distillation chamber 104 to the condenser 106 where the gas may go through a phase-change condensation as it passes through a cooling process in a swan neck of the condenser 106 and liquefies into water and oil. The volume of water and oil may flow into a separator 108 where the oil may rise to the top of the water to be poured off into containers or the like.

In each of these distillation processes, in certain embodiments, as the steam rises, it carries the released oil vapor into the condenser 106 where the water and oil vapor may convert to a liquid and flow into a separator.

There may be many variables in steam distillation. Subtle differences in equipment design and processing conditions, in certain embodiments, may translate into differences in essential oil quality. The size and material of the distillation chamber 104, the type of condenser 106 and separator 108, and the temperature and pressure may each have an impact on the oil quality. For example, if the pressure or temperature is too high, or if the cooking chambers are constructed from reactive materials, the resulting oil may not be 100% pure or may not adequately include all of the natural oil compounds found in the plant. Vertical steam distillation, in certain embodiments, may protect the natural properties and quality of essential oil as it is removed from the plant material. Low pressure (e.g., 5 psi or lower) and low temperature, in certain embodiments, may produce the most complete and natural essential oil. In a further embodiment, the system 100 may produce oils using zero pounds of pressure during distillation.

Temperature may also have a distinct effect on the produced oil. At certain temperatures, the oil fragrance and chemical constituents may become altered. High pressures and high temperatures, in various embodiments, may cause harshness in the oil. Even the oil pH and the polarity may be affected by pressure, temperature, or the like. For example, the system 100 may produce cypress oil using a minimum of 24 hours of distillation at or around 265° F. and about 5 pounds of pressure or less to extract most of the therapeutically-active constituents. If distillation time is reduced by only two hours, 18 to 20 constituents may be missing from the resulting oil. Accordingly, shorter distillation times may allow the producer to cut costs and produce cheaper oil, since money is saved on the fuel used to generate the steam. Shorter distillation times may also cause less wear and tear on equipment. Sadly, however, shorter distillation times may result in oil that is not as complete and natural. Such oil may have less therapeutic value.

Reference will now be made to the specific features of the components of the system 100, as shown in FIG. 1. In one embodiment, the boiler 102 is an industrial boiler capable of producing large, continuous volumes of steam. In other embodiments, the boiler is a heat source, such as a hot plate, which heats the water and converts it into steam. The boiler 102 can also include one or more other devices and/or systems configured to produce the steam necessary for the distillation process. The temperature of the steam, in certain embodiments, may determine a quality of the resulting oil and the degree of heat may be determined based on the plant material being processed. In a further embodiment, one or more gas heaters may warm or otherwise heat water that is stored in holding tanks.

The boiler 102, in one embodiment, comprises a water tank or the like in which the boiler 102 boils water to produce steam and the steam is routed to and forced below the plant material in the distillation chamber 104. As the steam rises within the distillation chamber 104, the aromatic oils are removed. Water tanks for the boiler 102 may hold gallons of water. As the boiler 102 turns water to steam, it is piped to the bottom of the distillation chamber 104, which may comprise one or more stainless steel chambers or the like.

In the depicted embodiment, a temperature sensor 112, such as a thermometer is disposed at or near the boiler 102 (e.g., at an input into or steam inlet pipe of the distillation chamber 104, between the boiler 102 and the distillation chamber 104, inside the heated flask of the boiler 102, or the like) to measure the temperature of the steam. The temperature sensor 112 may be in communication with the controller 110. In the depicted embodiment, the controller 110 is in communication with a valve 118 to control the flow of steam from the boiler 102, which in turn affects the temperature of steam measured by the temperature sensor 112.

The controller 110, in one embodiment, may comprise a field-programmable gate array (FPGA) or other programmable logic, programmable logic controller (PLC), firmware for an FPGA or other programmable logic, microcode for execution on a microcontroller, an application-specific integrated circuit (ASIC), or the like. Further details relating to the controller 110 and/or relating to feedback control of the system 100 are included below with reference to FIGS. 4A and 4B.

The distillation chamber 104, or "cooking" chamber, can comprise one or more large, stainless steel chambers. In one embodiment, when distilling lavender, for example, it may take as much as 12,500 liters or more of lavender stems and flowers to produce 4-5 gallons of essential oil, or the like. A temperature sensor 114 can be a thermometer, thermocouple, or the like. The temperature sensor 114 can be coupled to the distillation chamber 104 or otherwise configured to measure the temperature within the distillation chamber 104. The controller 110 can be configured to adjust the opening of the valve 118, which allows steam into the distillation chamber, based on the temperature measurement from the temperature sensor 114 and/or 112. These control can control the internal temperature of the distillation chamber and the steam content within the distillation chamber. Furthermore, the controller 110 can controls the steam output from the boiler 102 based on temperature data received from one or more of the temperature sensors 112, 114, 116. Using this temperature data, the controller 110 can maintain the temperature of the distillation chamber 104 at or near a target temperature.

Steam and oil vapors may rise to the top of the distillation chamber 104, where they are channeled into the condenser 106. In one embodiment, cold water may surround a condenser tube of the condenser 106, causing the steam and the volatile plant essences to turn back into liquid, or the like.

The newly condensed essential oil and water may drip into a collecting flask of the separator 108. Because oil is lighter than water, the oil may float to the top of the collecting flask of the condenser 106 where it may be collected for use. The separator 108, in certain embodiments, may be located below (e.g., a floor below) the distillation chamber 104 and/or the condenser 106, such that the essential oils may be protected from sunlight exposure, kept cool, or the like. In one embodiment, this may protect the therapeutic qualities until the oil may be collected.

The system 100, in one embodiment, includes a temperature sensor 116 downstream from the condenser 106 (e.g., at the separator 108, between the separator 108 and the condenser 106, at an output or outlet of the condenser 106, or the like). The controller 110 may adjust a temperature of the condenser 106, by adjusting an amount of cool water or another coolant fluid flowing to and/or through the condenser 106 or the like, based on a temperature reading from the temperature sensor 116, to maintain and/or bring the temperature toward a target temperature (e.g., a target temperature for the volume of water/oil, a target temperature for the condenser 106, a target temperature for the separator 108, or the like). In another embodiment, a coolant fluid other than water may be used in the condenser 106. In general, the condenser 106 is a cooling apparatus that is configured to cool down and condense the vapor and steam into liquid form. In certain embodiments, the target temperature may be substantially static, with little or no change over time. In another embodiment, the controller 110 may adjust or update the target temperature based on a type of essential oil, based on an environment of the system 100, based on an amount of time until the oil may be collected, or the like.

As mentioned, in some embodiments, the system 100 may produce a composition of one or more essential oils, including a blend of two or more essential oils. In some embodiments, the composition consists essentially of essential oils. In other embodiments, the composition consists solely of essential oils. The essential oils can be substantially pure and uncut essential oils. Essential oils are naturally occurring aromatic liquids found in the roots, stems, bark, seeds, flowers, and other parts of plants. These oils are fat soluble, non-water-based phytochemicals that include volatile organic compounds. The chemistry of any particular essential oil can be very complex and may consist of hundreds of different and unique chemical compounds. In nature, these oils give plants their distinctive smells, provide protection against disease, and assist in pollination. When separated from their parent plant, essential oils in their pure form are translucent with colors ranging from clear to pink or blue.

Figure 2:
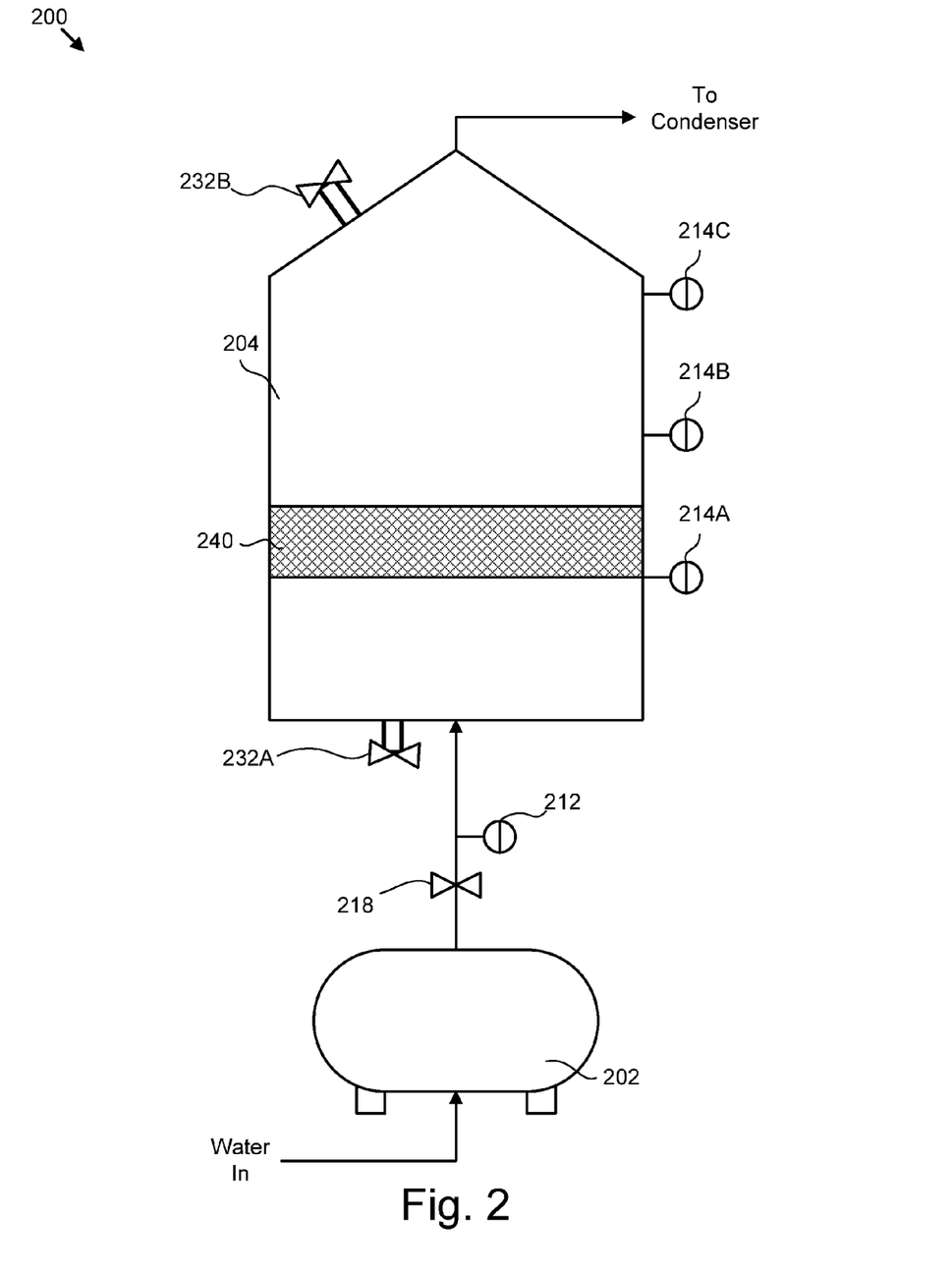
FIG. 2 is a schematic block diagram of a distillation chamber in fluid receiving communication with a boiler, according to one embodiment.

FIG. 2 is a schematic block diagram of various components of a system 200 for distillation extracting essential oil product from plant material, according to one embodiment. The system 200 includes a boiler 202 and a distillation chamber 204. Throughout the present disclosure, like reference numbers refer to like components. While the system 100 depicted in FIG. 1 shows a single temperature sensor 114 in the distillation chamber 104, in some embodiments there can be a plurality of temperature sensors 214A, 214B, 214C. For example, the plurality of temperature sensors 214A, 214B, 214C may be spaced apart vertically along the height of the distillation chamber, thus monitoring the temperature fluctuations and variations as a function of height in the distillation chamber 204.

In one embodiment, the distillation chamber may also include a plant material bed 240 that supports plant material in a desired position within the distillation chamber 204. The plant material bed 240 may be made from various materials, such as metal mesh, etc. The plant material bed 240 is configured to allow steam to pass through the bed while substantially preventing plant material from falling through the plant material bed 240. In one embodiment, the plant material may be compacted and/or compressed, either before being placed in the distillation chamber 204 or upon being placed into the distillation chamber 204. In one embodiment, one of the plurality of temperature sensors 214A may be disposed at or adjacent to the plant material bed 240 to monitor the temperature of the bed 240. In another embodiment, temperature sensors may be placed below, in the middle of, and/or above the plant material bed to report a detailed temperature gradient of the condition of the plant material bed 240.

In one embodiment, the vertical position of the plant material bed 240 may be adjusted according to the specifics of a given application. In another embodiment, the distillation chamber may have multiple plant material beds (not depicted). In such an embodiment, plant material may be placed on top surfaces of all of the plant material beds. In another embodiment, two plant material beds, at least one of which is vertically adjustable, may be used to sandwich plant material between the two plant material beds. In one embodiment, the plant material bed 240 may be removable or at least may be re-orientable in the distillation chamber. In one embodiment, the distillation chamber 204 may have a detachable/hinged lid that easily allows for plant material to be placed inside the distillation chamber 204.

In one embodiment, the distillation chamber 204 may also include various pressure sensors and various pressure regulation valves 232A, 232B that are in control communication with the controller 110. Once again, further details relating to the controller 110 and/or relating to feedback control are included below with reference to FIGS. 4A and 4B. The distillation chamber 204 may include an actuating vent 232A that is disposed below the plant material. In another embodiment, the distillation chamber 204 may include a vent 232B that is disposed above the plant material (e.g., near the top of the distillation chamber 204). For example, upon operation of the distillation system 200, the pressure sensors (not depicted) may report a pressure within the distillation chamber 204 below the plant material that the controller 110 determines is too high. The controller 110 may reduce steam flow to the distillation chamber 204 via the first valve 218 and/or the controller 110 may open one of the vent valves 232A to reduce the pressure in the distillation chamber 204. Throughout the present disclosure, the term "valve" may refer to an on/off type valve, a flow regulating valve, a multi-way valve, a pressure regulating valve, or the like. It is also expected that the distillation chamber may include other sensors/detectors, such as composition sensors, etc., that further monitor the distillation extraction of the essential oil product from the plant material.

Figure 3:
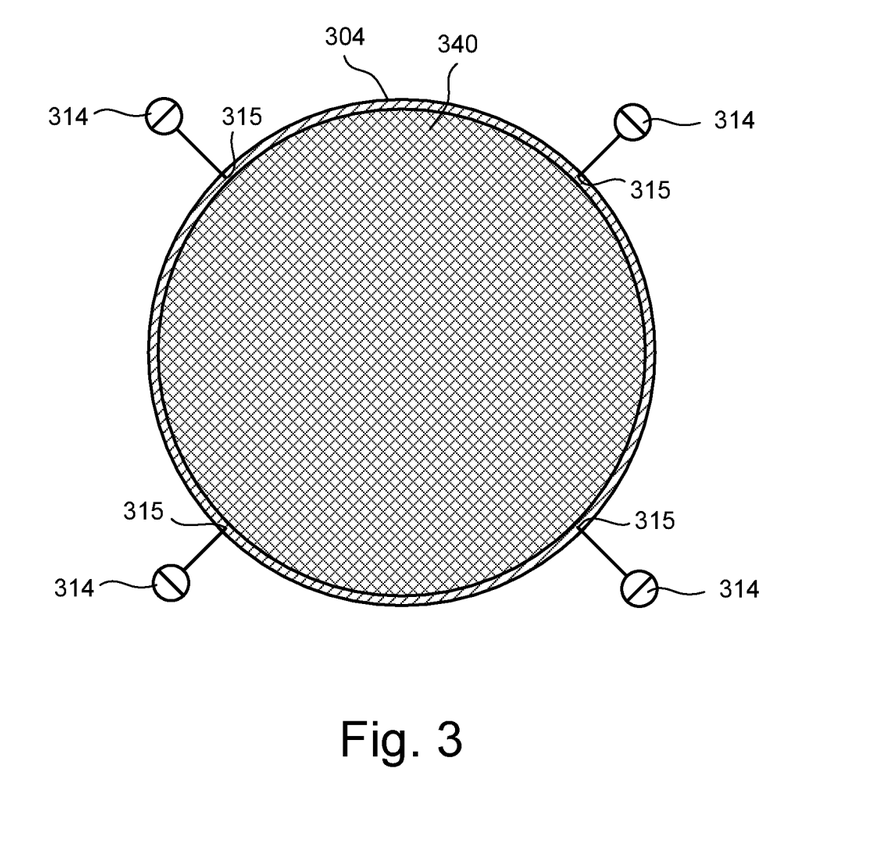
FIG. 3 is a schematic, top cross-sectional view of a distillation chamber, according to one embodiment.

FIG. 3 is a schematic, top cross-sectional view of a distillation chamber 304, according to one embodiment. The view of the distillation chamber 304 shows a plant material bed 340 and various temperatures sensors 314 that are circumferentially spaced apart around the distillation chamber. In such an embodiment, the temperature sensors may detect the lateral temperature variations across the plant material bed 240, thus monitoring potential regions of the plant material that may be incorrectly loaded and/or that may be exhausted of essential oil vapor.

As described above, the temperature sensors 314 may be thermocouples that have sensing element 315. In one embodiment, the sensing element 315 of each temperature sensor may be disposed in a recess of an internal surface of the distillation chamber 304. In such an embodiment, the sensing element 315 of the temperatures sensors 314 is protected from the loading and/or unloading of plant material and/or from the vertical position adjustment of the plant material bed 340.

Figure 4A:
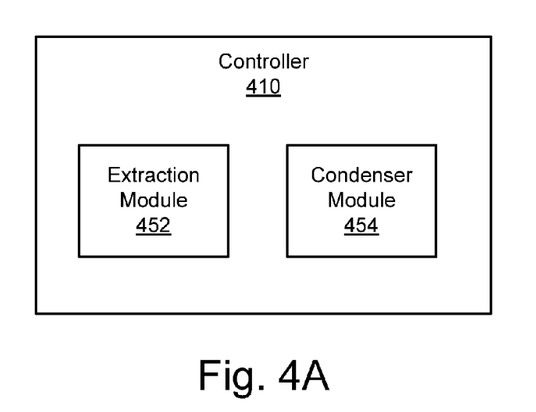
FIG. 4A is a schematic block diagram of a controller for controlling a distillation system, according to one embodiment.

FIG. 4A is a schematic block diagram of one embodiment of a controller 410 for controlling a distillation system, according to one embodiment. The controller 410 includes at least an extraction module 452, but may also include other modules such as a condenser module 454. The controller 410, in certain embodiments, may be substantially similar to the controller 110 described above with regard to FIG. 1. The controller 410 may comprise a field-programmable gate array (FPGA), a programmable logic controller (PLC), other programmable logic, firmware for an FPGA or other programmable logic, microcode for execution on a microcontroller, an application-specific integrated circuit (ASIC), or the like. In a further embodiment, at least a portion of the controller 410 may comprise computer executable code stored on a non-transitory storage medium for execution by a processor of a computing device.

The extraction module 452 generally contributes to controlling the extraction of essential oil vapor from the plant material within the distillation chamber. In one embodiment, the extraction module 452 receives temperature readings from the one or more temperature sensors in the distillation chamber (the process variable) and compares the reported temperature reading to an expected/desired temperature (the set point). Depending on the difference between the temperature reading and the desired temperature, for example using control loop feedback mechanisms, such as Proportional, Integral, and/or Integrative values in a control scheme (e.g., a "PID" controller), the controller may manipulate a control variable, such as the first valve 118, 218 disposed in the steam outlet from the boiler, to regulate the temperature within the distillation chamber. It is expected that other sensors, such as pressure sensors and/or composition sensors, and other actuating mechanisms, such as vents and/or heating rates, may be utilized as the process variable and the control variable, respectively.

In one embodiment, the controller 410 includes the condenser module 454. The condenser module 454, which may be similar in principle to the extraction module 452, may generally control the operation of the condenser. For example, the condenser module 454 may receive temperature readings from a temperature sensor in the liquid product outlet (process variable) and may manipulate the inlet flow of coolant to the condenser (manipulated/control variable) based on the temperature reading.

Figure 4B:
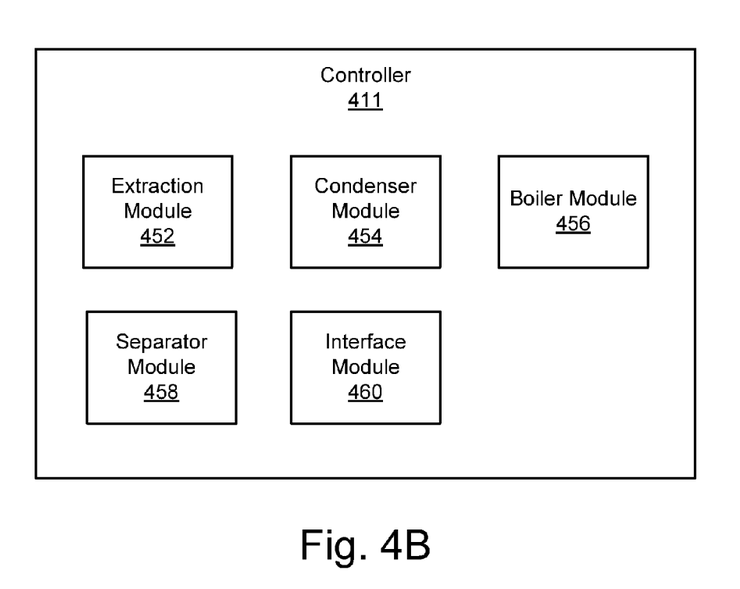
FIG. 4B is a schematic block diagram of a controller for controlling a distillation system, according to another embodiment.

FIG. 4B is a schematic block diagram of another embodiment of a controller 411 for controlling a distillation system. The controller 411 includes an extraction module 452, a condenser module 454, a boiler module 456, a separator module 458, and an interface module 460. The extraction module 452 and the condenser module 454 are as described above with reference to FIG. 4A. The controller 411, in certain embodiments, may be substantially similar to the controller 110 described above with regard to FIG. 1. The controller 411 may comprise a field-programmable gate array (FPGA), a programmable logic controller (PLC), other programmable logic, firmware for an FPGA or other programmable logic, microcode for execution on a microcontroller, an application-specific integrated circuit (ASIC), or the like. In a further embodiment, at least a portion of the controller 411 may comprise computer executable code stored on a non-transitory storage medium for execution by a processor of a computing device.

The boiler module 456 may receive temperature readings from the temperature sensor at the steam outlet of the boiler and may adjust the heat applied to the boiler in order to more accurately control the temperature and/or pressure of the steam. As described above, other variables may be used as the process variable and/or the manipulated/control variable in the various modules 452, 454, 456 of the controller 410. For example, a scale may be implemented in conjunction with the distillation chamber to measure the extent of extraction of essential oil from the plant material.

The separator module 458 controls the operation of the separator. In one embodiment, the separator module 458 may receive readings from a scale or other sensor that signals a certain volume of liquid in the separator/collector. The separator module 458 may then actuate a separation procedure in which the essential oil product is separated from the water. As described above, in certain embodiments the essential oil product weighs less than liquid water and the two liquids are immiscible. Accordingly, the essential oil product may rise to the top portion of the separator with the liquid water below. A pump may be used to suction of the top portion (e.g., the essential oil portion) of the volume of liquid in the separator/collector. In another embodiment, the liquid water portion may be pumped away, leaving the essential oil product. In another embodiment, the level of the water and essential oil in the separator may be monitored by using float sensors or the like. As the level rises, an overflow gate may be actuated by the separator module 458 that allows the top, essential oil portion to flow out of the separator.

In one embodiment, the controller may include a human machine interface that allows users to interface with the various modules of the controller. The interface module 460 may be configured to record the operating parameter adjustments of a specific extraction procedure for a specific plant material. In one embodiment, each plant material may include a set of operating extraction parameters (temperature set points, temperature ramp rates, etc.) that are specific to optimizing extraction of essential oil vapor from the specific plant material. For example, lavender oil may be extracted from lavender plant material using temperatures and temperature ramp rates that are different from other plant material extractions. Thus, a user may use the human machine interface of the controller 411 (e.g., the interface module 460) to input the type and/or volume/weight of the plant material loaded into the distillation chamber, thus allowing the controller 411 to run an extraction procedure specifically tailored to that charge of plant material.

The interface module 460, in certain embodiments, may provide readings from one or more temperature sensors (e.g., a temperature sensor of the distillation chamber, a temperature sensor of the liquid outlet of the condenser, a temperature sensor of the steam outlet of the boiler, or the like) to a user, to provide the user a current status, to assist the user in determining, adjusting, and/or providing a set of operating parameters to the interface module 460 (e.g., an adjusted set of one or more temperature set points for an essential oil product or the like).

The interface module 460 may be configured to automatically update, or at least include notes/recommendations for future updates, to the specifically tailored extraction procedure for the specific plant material. In other words, the interface module 460, through multiple extraction procedures, may identify adjustments to the extraction procedure that would increase the efficiency of the extraction procedure and decrease the number and/or extent of feedback-type adjustments that are made during the extraction procedure. It is also expected that other modules may be included and/or other functionalities may be performed by the controller. The following is one example of a temperature control scheme that may be executed by the controller (e.g., the extraction module 452).

The interface module 460 may further be configured to provide a user with the ability to stop, pause, restart, reset, or otherwise affect the extraction procedure. In one embodiment, the interface module 460 also displays the readings from various sensors corresponding to the status of the system. The interface module 460 may further allow users to customize and/or change operating parameters of extraction procedure.

The controller 411 may include data tables that include settings for multiple stages. Each data table may be specific to a type of plant material. Each stage may include temperature set points and corresponding time durations that are to be realized in the distillation chamber. For example, the extraction module 452 may be configured to actuate/control the steam valve upstream of the distillation chamber to sequentially step through the stages and ramp the temperature within the distillation chamber to the temperature set points for the corresponding time durations. In one embodiment, the controller 411 may also dynamically account for unexpected undershoots/overshoots in temperature by adjusting the temperature set point and/or time duration of subsequent stages. Once an extraction procedure beings, for example, the valve in the steam outlet may be manipulated to change the temperature in the distillation chamber. If the change to the temperature is not realized within a specified time frame, the steam valve may change/actuate (e.g., open further) by a specific increment. Each stage may have a retentive timer which means the timer will not be reset unless another extraction has been started. For example, one data table may include the following stages:

EXAMPLE 1

210 Deg F., 5 Min
220 Deg F., 10 Min
230 Deg F., 15 Min
240 Deg F., 20 Min
250 Deg F., 25 Min
and the other process parameters may be as follows:
Starting Steam Setpoint=25%
Ramp Setpoint Increment=2%
The Temperature Setpoints may be calculated per stage for PLC (e.g., controller 110, 410, 411) use. (e.g., the temperature ramp table above may be adjusted based on the starting steam setpoint and the ramp setpoint increment above).

In one embodiment, each data table may include stages that have sequentially increasing temperature set points and sequentially increasing time durations.

Referring back to the general depiction of one embodiment of the system 100 in FIG. 1, in certain embodiments and with certain plant materials, sudden temperature changes and/or elevated temperatures may decrease the quality of the essential oil extracted from the plant material, thus potentially decreasing the therapeutic properties of the essential oil. For example, instead of distilling lavender or another essential oil for only 15 to 20 minutes at 155 pounds of pressure with a steam temperature approaching 350° F., the system 100 may extract, for example, lavender essential oil at zero pounds of pressure for a minimum of about 1 hour and 15 minutes or the like in order to retain the therapeutic properties of the essential oil. The system 100, in a further embodiment, may distill essential oils introducing little or no chemicals into the steam distillation process. For example, other distillation processes may use chemical trucks to pump solvents directly into the boiler water of the boiler 102. Although solvents or other chemicals may increase oil production, the chemicals inevitably leach into the distilling water and mix with the essential oil, fracturing the molecular structure of the oil, altering the oil's fragrance, altering the oil's therapeutic value, or the like. It may be difficult or impossible to completely separate such chemicals from the distilled oil, so the chemicals may remain in the oil even after it is sold, or the like.

In one embodiment, the system 100 may use a single distillation process, instead of attempting to increase the quantity of the oil extracted through redistillation. Redistillation refers to the repeated distillation of the plant material to maximize the volume of oil by using second, third, and/or fourth stages of steam distillation. Each successive distillation may generate a weaker and less potent essential oil. Such essential oils may also be degraded due to prolonged exposure to water and heat used in the redistillation process. This water may hydrolize or oxidize the oil and begin to chemically break down the constituents responsible for its aroma and therapeutic properties.

Essential oils may be chemically complex with literally hundreds of chemical components, some of which—even in small quantities—may contribute important therapeutic benefits. The system 100, in certain embodiments, may preserve as many as possible of these delicate aromatic constituents by steam-distilling plant material in small batches, using low pressure and low heat, or the like. The distillation chamber 104, in one embodiment, may be constructed of a nonreactive metal, such as stainless steel, to reduce the possibility of the essential oil being chemically altered by more reactive metals such as aluminum, copper, or the like.

The system 100, in certain embodiments, may use or add little or no solvents or synthetic chemicals to the water of the boiler 102 used to generate steam because they might jeopardize the integrity of the produced essential oil. Even the addition of chemicals to water used in a closed-loop, heat-exchange system of the condenser 106, in one embodiment, may be avoided, since there is no guarantee that the chemicals will be completely isolated from the essential oil. The system 100 may distill essential oils without chemicals and descaling agents. The system 100 may process herbs or other plants cultivated with little or no pesticides, herbicides, fungicides, or agricultural chemicals, which may react with the essential oil, even in minute quantities, and degrade its purity and quality and render it therapeutically less effective. During distillation, pesticide residue may leach out of the plant material with the extracted essential oil.

Producing pure essential oils may be very costly. For example, several hundred or even thousands of pounds of raw plant material may be used to produce a single pound of essential oil. It may take 2-3 tons of melissa plant material to produce one pound of melissa oil, making it expensive. It may take 5,000 pounds of rose petals to produce approximately one pint of rose oil, making it expensive. The vast majority of oils are produced for the perfume industry, which is only interested in their aromatic qualities.

High pressures, high temperatures, and chemical solvents in a distillation process may produce greater quantities of oil in a shorter time. To most people, these oils may carry a pleasant aroma, but they may lack true therapeutic properties. Many of the important chemical constituents necessary to produce therapeutic results may either be flashed off with the high heat or are not released from the plant material.

Figure 5:
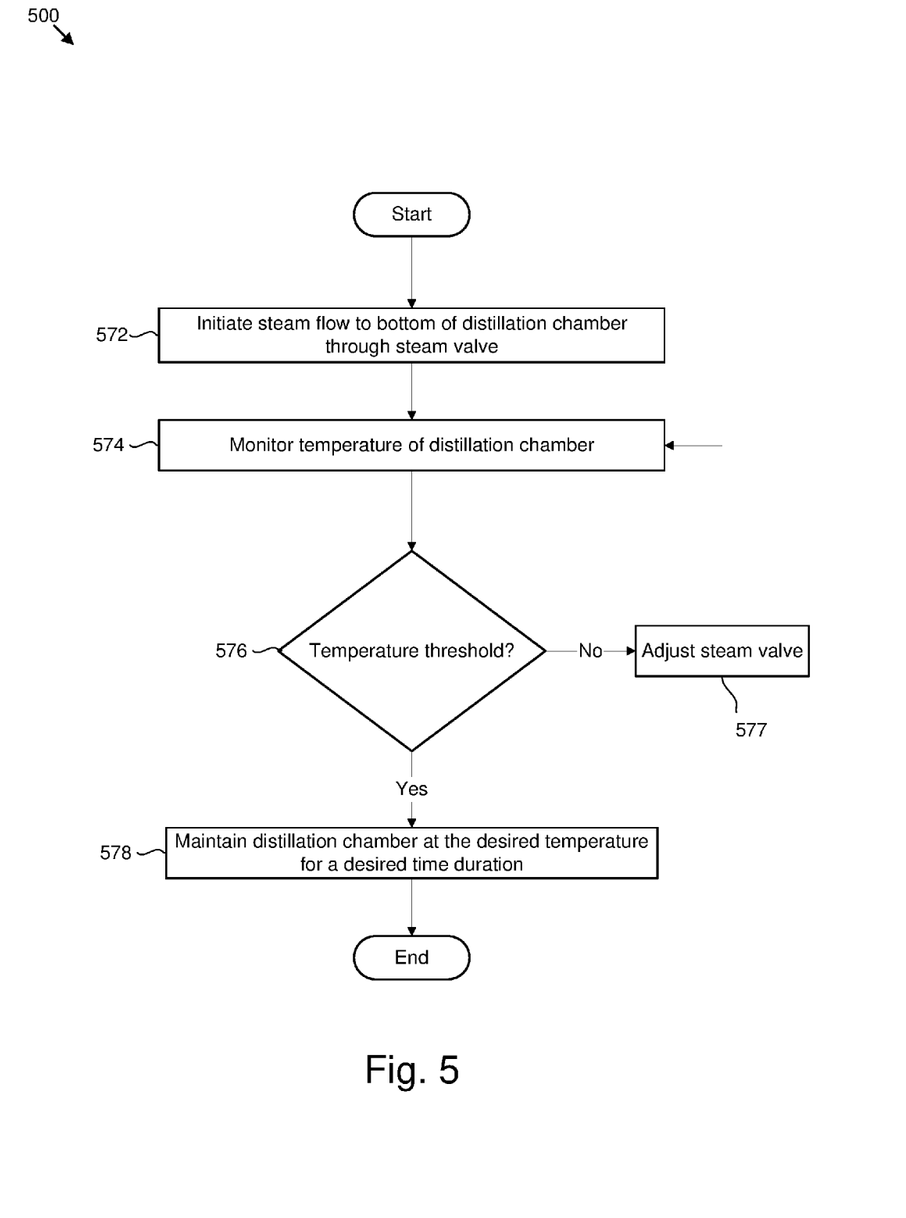
FIG. 5 is a schematic flow chart diagram of a method for distillation extracting essential oil from plant material, according to one embodiment.

FIG. 5 is a schematic flow chart diagram of a method 500 for distillation extracting essential oil from plant material. The method 500 includes initiating 572 steam flow to a bottom portion of a distillation chamber. In one embodiment, the extraction module 452 may open the steam valve to an initial position (e.g., 25% open). The method 500 further includes monitoring 574 the temperature in the distillation chamber. As described above, one or more temperature sensors may be disposed throughout the distillation chamber and the readings from the temperature sensors may be received by the extraction module 452 to monitor the operating condition of the distillation chamber.

The method 500 further includes determining 576 by the extraction module 452 if the temperature detected from the temperature sensors meets a desired temperature threshold. If the extraction module 452 determines that the distillation chamber does not meet the temperature threshold, the extraction module 452 adjusts 577 the steam valve and the extraction module 452 continues to monitor the temperature within the distillation chamber. In one embodiment, as described above, the adjustment to the steam valve may be a predetermined increment, such as 2%. Thus, if the temperature in the distillation column is below the temperature threshold, the extraction module 452 may open the steam valve by the predetermined increment (and vice-versa). If the extraction module 452 determines that the distillation chamber is at the temperature threshold (e.g., the set point), the method 500 continues by maintaining 578 the temperature of the distillation chamber at the temperature threshold for a desired time duration.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. Where a module or portions of a module are implemented in software, the program code may be stored in one or more computer readable medium(s).

The computer readable medium may be a tangible or non-transitory computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible or non-transitory medium (e.g., volatile memory or storage medium, non-volatile memory or storage medium) that can contain, and/or store program code for use by and/or in connection with an instruction execution system, apparatus, or device.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for distilling essential oils, the system comprising:
    a distillation chamber for extracting essential oil from plant material, wherein the distillation chamber is coupled in fluid receiving communication with a steam source via a first valve, the distillation chamber comprising a first temperature sensor and a vapor outlet, wherein the steam and essential oil vapor operably exit the distillation chamber through the vapor outlet;
    a condenser for condensing vapors, wherein the condenser is in fluid receiving communication with the vapor outlet of the distillation chamber, wherein the steam and the essential oil vapor are condensed to form liquid water and essential oil product, respectively, that operably exit through a liquid outlet; and
    a controller comprising an extraction module, wherein the extraction module is programmed to control the first valve based on readings from at least the first temperature sensor, the controller programmed to access a table comprising multiple stages of temperature set points and corresponding time durations and to apply heat to the distillation chamber in a sequence based on the temperature set points for the corresponding time durations the sequence corresponding to an identified type of the plant material.

2. The system of claim 1, wherein the condenser comprises a coolant inlet, a coolant outlet, and a liquid outlet, wherein the coolant inlet comprises a second valve, the liquid outlet comprises a second temperature sensor, and the controller comprises a condenser module, wherein the condenser module is configured to control the second valve based on readings from the second temperature sensor.

3. The system of claim 1, wherein the first temperature sensor of the distillation chamber is a first temperature sensor array comprising a plurality of temperature sensors.

4. The system of claim 3, wherein the plurality of temperature sensors is spaced apart vertically along a height of the distillation chamber.

5. The system of claim 3, wherein the plurality of temperature sensors is spaced apart circumferentially around the distillation chamber.

6. The system of claim 1, wherein the distillation chamber comprises a vent valve and the extraction module is further configured to control the vent valve to decrease pressure in the distillation chamber.

7. The system of claim 1, wherein the distillation chamber comprises a plant material bed that supports the plant material in a desired position within the distillation chamber.

8. The system of claim 7, wherein the position of the plant material bed in the distillation chamber is moveable along a height of the distillation chamber.

9. The system of claim 8, wherein the first temperature sensor comprises a sensing element that is disposed in a recess of an internal surface of the distillation chamber.

10. A system for distilling essential oils, the system comprising:
- a distillation chamber for extracting essential oil from plant material, wherein the distillation chamber is coupled in fluid receiving communication with a steam source via a first valve, wherein a steam temperature sensor is disposed between the steam source and the distillation chamber, the distillation chamber comprising a first temperature sensor and a vapor outlet, wherein the steam and essential oil vapor operably exit the distillation chamber through the vapor outlet;
- a condenser for condensing vapors, wherein the condenser is in fluid receiving communication with the vapor outlet of the distillation chamber, the condenser comprising a coolant inlet, a coolant outlet, and a liquid outlet, wherein the coolant inlet comprises a second valve and the liquid outlet comprises a second temperature sensor, wherein the steam and the essential oil vapor are condensed to form liquid water and essential oil product, respectively, that operably exit through the liquid outlet; and
- a controller comprising an extraction module and a condenser module, wherein the extraction module is programmed to control the first valve based on readings from the steam temperature sensor and the first temperature sensor and the condenser module is configured to control the second valve based on readings from the second temperature sensor, the controller programmed to access a table comprising multiple stages of temperature set points and corresponding time durations and to apply heat to the distillation chamber in a sequence based on the temperature set points for the corresponding time durations the sequence corresponding to an identified type of the plant material.

11. The system of claim 10, wherein the first temperature sensor of the distillation chamber is a plurality of temperature sensors.

12. The system of claim 11, wherein the plurality of temperature sensors is spaced apart vertically along a height of the distillation chamber.

13. The system of claim 11, wherein the plurality of temperature sensors is spaced apart circumferentially around the distillation chamber.

14. The system of claim 13, wherein the distillation chamber comprises a plant material bed that supports the plant material in a desired position within the distillation chamber, wherein the plurality of temperature sensors that are circumferentially spaced apart monitor the temperature of the plant material bed.

15. The system of claim 10, wherein the distillation chamber comprises a plant material bed that supports the plant material in a desired position within the distillation chamber.

16. The system of claim 15, wherein the position of the plant material bed in the distillation chamber is moveable along a height of the distillation chamber.

17. The system of claim 16, wherein the first temperature sensor comprises a sensing element that is disposed in a recess of an internal surface of the distillation chamber.

18. An apparatus for distilling essential oils, the apparatus comprising:
- a distillation chamber;
- a steam valve coupled to the distillation chamber upstream of the distillation chamber to supply steam to a bottom portion of the distillation chamber;
- an extraction module programmed to control the steam valve upstream of the distillation chamber based on readings from a temperature sensor of the distillation chamber and a steam temperature sensor disposed between the distillation chamber and a steam source and based on one or more temperature set points corresponding to the distillation chamber, the extraction module programmed to access a data table comprising multiple stages of temperature set points and corresponding time durations and to apply heat to the distillation chamber in a sequence based on the temperature set points for the corresponding time durations the sequence corresponding to an identified type of a plant material; and
- a condenser module programmed to control a valve of a coolant inlet of a condenser based on readings from a temperature sensor of a liquid outlet of the condenser.

19. The apparatus of claim 18, wherein the extraction module is configured to access a plurality of data tables, wherein each data table corresponds to one or more types of plant material, wherein each data table comprises multiple stages, wherein each stage comprises the temperature set point and the corresponding time duration, wherein the extraction module is configured to control the steam valve to sequentially step through each of the multiple stages by ramping the distillation chamber to each temperature set point for the corresponding time duration from one of the plurality of data tables.

20. The apparatus of claim 19, wherein the multiple stages of each data table comprise sequentially increasing temperature set points and sequentially increasing time durations.

* * * * *